United States Patent [19]

Radermacher et al.

[11] Patent Number: 4,547,717
[45] Date of Patent: Oct. 15, 1985

[54] ADJUSTING DEVICE FOR THE POINT OF ARTICULATION OR THE POINT OF DEFLECTION OF A SAFETY BELT

[75] Inventors: Karl-Heinz Radermacher, Pöcking; Josef Haberl, Aschheim, both of Fed. Rep. of Germany

[73] Assignee: Bayerische Motoren Werke Aktiengesellschaft, Fed. Rep. of Germany

[21] Appl. No.: 486,492

[22] Filed: Apr. 19, 1983

[30] Foreign Application Priority Data

Apr. 21, 1982 [DE] Fed. Rep. of Germany ....... 3214712

[51] Int. Cl.⁴ ............................................... H01H 7/00
[52] U.S. Cl. ..................................... 318/484; 280/804
[58] Field of Search ............................ 280/806–808, 280/804; 364/425; 318/292, 475, 624, 678, 681, 484

[56] References Cited

U.S. PATENT DOCUMENTS 3,736,486 5/1973 Gould et al. .................. 318/624
4,256,331 3/1981 Schwanz et al. .............. 280/804

Primary Examiner—William M. Shoop, Jr.
Assistant Examiner—Saul M. Bergmann
Attorney, Agent, or Firm—Craig & Burns

[57] ABSTRACT

An adjusting device for the point of articulation or the point of deflection of a safety belt in automotive vehicles permits continuous adjustment of the angle of articulation for the safety belt in contact with the shoulder of the vehicle occupant to a predetermined value with the aid of an electric pickup for the angle of articulation, arranged at the point of articulation or deflection, and a comparison circuit connected after this pickup, which comparison circuit contains the predetermined value.

18 Claims, 2 Drawing Figures

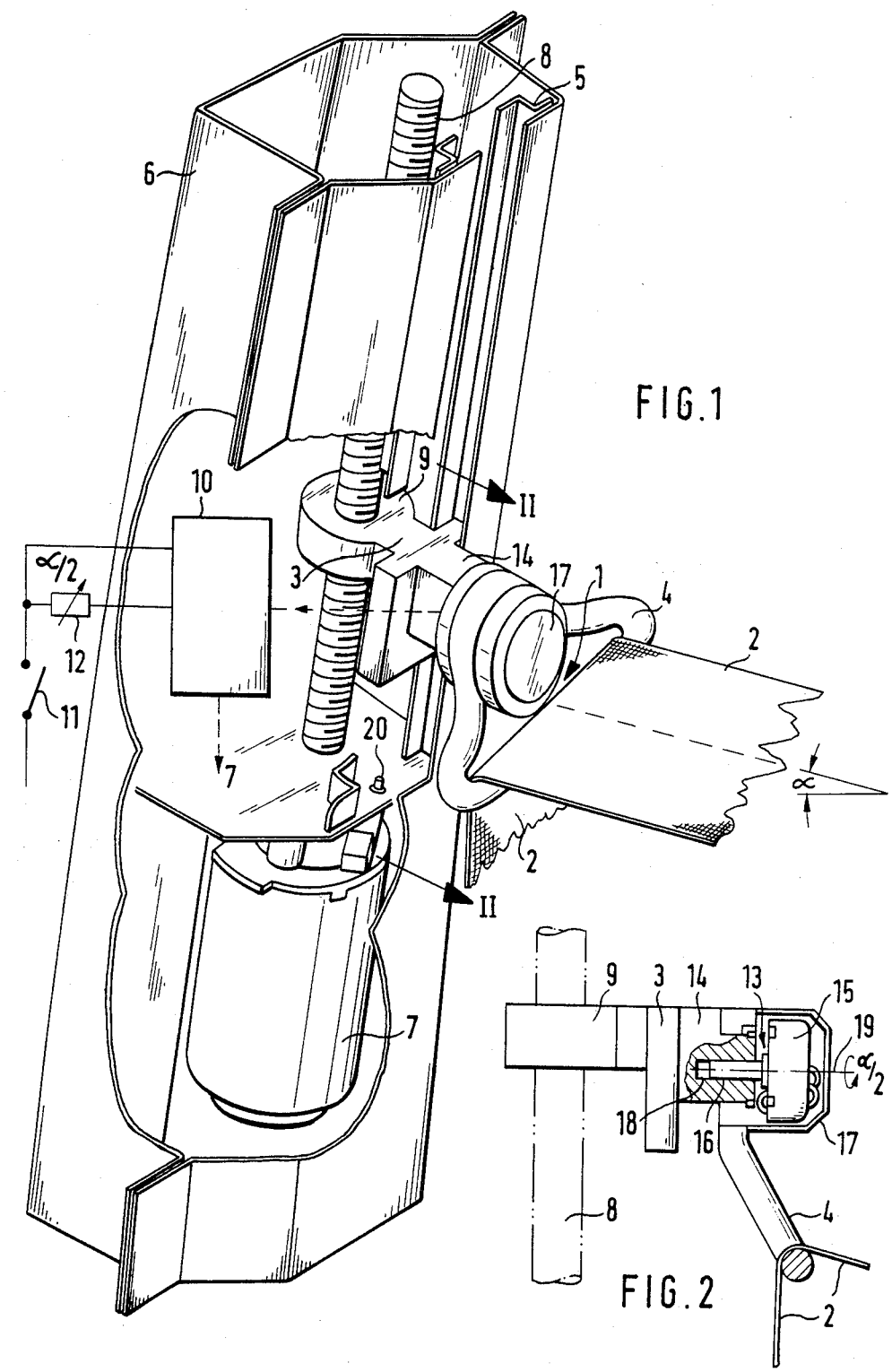

ADJUSTING DEVICE FOR THE POINT OF ARTICULATION OR THE POINT OF DEFLECTION OF A SAFETY BELT

The present invention relates to an adjusting device for the point of articulation or the point of deflection of a safety belt in automotive vehicles. The point of articulation or deflection is a slide which is adjustable vertically in a guide means so that the angle of articulation of the safety belt lying on contact with the shoulder of the vehicle occupant exhibits a predetermined value.

Such an adjusting device is known in a passive-restraint safety belt, as in, for example, DOS No. 2,522,415. In this arrangement, a mechanical detent wheel is rotated in the guide means for the safety belt in correspondence with the angle of articulation. The detent wheel enters into the operative position at the predetermined value of the angle of articulation and retains the slide in engagement against one of several stops arranged at discrete elevational positions.

This conventional apparatus is very expensive and normally permits only an approximate adjustment of the "optimal" angle of articulation because the slide may only be maintained in one of several definite vertical positions.

An automatic adjustment of the angle of articulation can be provided by making improvements in the individual components of the device. DOS No. 2,522,415 proposes a mechanically acting drive mechanism for the slide. Disadvantageously, the device is operative only directly after closing the vehicle door.

The aim underlying the present invention essentially resides in providing an adjusting device for the point of articulation or deflection of a safety belt, constructed in an advantageously simple way, wherein it is possible to achieve an exact setting of the angle of articulation to the predetermined value.

In accordance with the aim of the present invention, an electric pickup means is provided for the angle of articulation of the safety belt, which is arranged in or at the angle of articulation. A comparison circuit is disposed thereafter, which contains the predetermined value of the angle of articulation.

Another feature of the present invention is to provide means for decoupling the functions of the mechanical determination of the angle of articulation and for adjusting this angle to the predetermined value, and for independently obtaining the angle of articulation that is actually present. Thus, it is possible to adjust the angle of articulation in a variety of ways. Furthermore, by the use of electrical components, a failsafe apparatus of long-term durability is obtained.

In accordance with the advantageous features of the present invention, the value of the actual angle of articulation produced in this invention can be processed in various ways. Thus, it is possible to provide a manually operable adjusting device and enhance the adjustment of the angle of articulation to the exact value by, for example, an optical comparison of the actual and predetermined values for the angle of articulation.

As a further advantageous feature of the present invention, it is possible to provide an automatic adjustment of the angle of articulation. This is made possible in accordance with the present invention by the use of an electric motor as the drive means for the slide. The motor is controlled by the comparison circuit so that the angle of articulation has a predetermined value. By virtue of this arrangement, it is now possible to have the device operative not only, as in the conventional apparatus, directly after closing the vehicle door, but also, for example, during the entire driving period. During relatively long trips, the occupants of the vehicle will change their seating positions several times. It is now possible by means of the electric motor to readjust the angle of articulation at all times so that the safety belt is always in ideal contact. By virtue of the present invention, the device can be ready for operation at all times. The always up-to-date signal, delivered by the pickup for the angle of articulation, can immediately be converted into an appropriate control of the electric motor.

In accordance with another feature of the present invention, it is possible to provide for the vertical adjustment of the slide in a constructionally simple way with the aid of a spindle driven by the electric motor.

A further feature of the present invention is to provide a drive mechanism which avoids unnecessary operation of the electric motor. For example, activating the comparison circuit only when the safety belt has been put on involves no measures which prevent, when the safety belt has not been put on, an activation of the adjusting aids for the manual adjusting device and, in case of automatic operation, a switching on of the electric motor. As the indicator for the applied safety belt, a simple switch can be provided contained in the belt lock and operated by the belt tongue. Advantageously, end position switches can be provided in the path of the slide, which turn the electric motor off. Therefore, in case of trouble and in case of extreme size of vehicle occupants, unnecessary operation of the electric motor is avoided.

Yet another feature of the present invention is provided in regulating the predetermined value of the angle of articulation to the particular vehicle used. It has been found that the optimum angle of articulation for one kind of vehicle is a constant, at least in an approximation. Therefore, with one specific type of vehicle, the angle of articulation has the same value for large and small vehicle occupants. Thus, the safety belt will fit exactly. However, the same occupants, in a different vehicle type, would require a markedly different angle of articulation of the safety belt. This circumstance is solved by making the predetermined value of the angle of articulation in the comparison circuit specific to the particular vehicle.

Yet another feature of the present invention is to provide a rotary potentiometer as the pickup means for the angle of articulation. Advantageously, the pickup means can be limited in structural volume by at least partially integrating such arrangements in a turning knuckle setting the angle of articulation of the safety belt. Such an integration, per se, is known from German Pat. No. 2,929,420, which provides a rotary potentiometer as a trimming pickup integrated into the turning knuckle of a motor boat drive mechanism.

Accordingly, it is an object of the present invention to provide an improved adjusting device for the point of articulation or the point of deflection of a safety belt in automotive vehicles, with slide means constituting the point of articulation or deflection, where the slide means are vertically adjustable on guide means so that the angle of articulation of the safety belt resting on the shoulder of the vehicle occupant has a predetermined value wherein electric pickup means for the angle of articulation of the safety belt are arranged in one of in and at the point of articulation or deflection and a comparison circuit is arranged after said pickup, said circuit containing the predetermined value.

Another object of the present invention is to provide an adjusting device containing a drive mechanism for the slide means, wherein said comparison circuit controls an electric motor means serving as the electric drive means and the vertical adjustment of said slide means is accomplished by a spindle driven by said electric motor means.

Yet another object of the present invention is to provide an adjusting device wherein the comparison circuit means are only activated by switch means when the safety belt has been applied, wherein end position switches are provided which deactivate the electric motor means.

Still another object of the present invention is to provide an adjusting device wherein the predetermined value of the angle of articulation is specific to the vehicle.

A further object of the present invention is to provide an adjusting device wherein the pickup means for the angle of articulation is a rotary potentiometer and the rotary potentiometer is integrated within a turning knuckle adjusting the angle of articulation.

Yet another object of the present invention is to provide an adjusting device wherein it is possible to achieve an exact setting of the angle of articulation to the predetermined value.

These and other objects, features, and advantages of the present invention will become more apparent from the following description when taken in connection with the accompanying drawings which show, for the purposes of illustration only, one embodiment in accordance with the present invention, and wherein:

FIG. 1 is a perspective view of an adjusting device corresponding to the invention and FIG. 2 is a section along line II—II in FIG. 1.

Referring now to the drawings wherein like reference numerals are used throughout the various views to designate like parts and, more particularly, to FIG. 1.

According to this Figure, the adjusting device for adjusting the point of articulation or deflection 1 of a safety belt 2 in its vertical position to a predetermined value is shown. This device contains a slide 3 carrying a guide fitting 4 comprising the point of articulation or deflection 1, which is adjustable in its level within a guide rail 5 arranged in the so-called B pillar 6 of an automotive vehicle.

For this purpose, a drive mechanism is provided in the form of an electric motor 7 rotating a spindle 8. The spindle 8 extends, in the illustrated view, outside of the guide rail 5 and is surrounded by a threaded extension 9 of the slide 3. The electric motor 7, in turn, is controlled by a schematically illustrated comparison circuit 10 activated by belt lock switch 11. The switch 11 is closed if the belt tongue of the safety belt 2 is inserted in a belt lock, not shown, and in such a case connects the comparison circuit 10 with a current source (+).

The comparison circuit 10 contains a predetermined value for the angle of articulation of the safety belt 2. This value can be adjusted from the outside, for example, with the aid of an adjustable potentiometer 12.

This predetermined value, selected, for example, in a vehicle-specific manner, is compared with the actual value of the angle of articulation $\alpha$. Referring now to FIG. 2, in order to determine the actual value, a rotary potentiometer 13 is provided which is integrated into a pin 14 forming a turning knuckle for the deflection fitting 4. The pin 14 is another extension of the slide 3.

The construction of the pin 14 and/or the rotary potentiometer 13 integrated therein is illustrated in FIG. 2. The rotary potentiometer 13 consists of a rotary part 15 and a fixed part 16. The rotary part 15 is held in a cover 17 connected with the guide fitting 4, while the fixed part is seated in a bore 18 of the pin 14.

By means of the electric motor 7, the guide fitting 4 is adjusted in its height via the slide 3 so that the angle of articulation $\alpha$ of the safety belt 2 is equal to the predetermined value. The angle of articulation $\alpha$ is the angle assumed by the safety belt 2, while resting on the shoulder of the vehicle occupant, with respect to the horizontal. This predetermined value of the angle $\alpha$ is attained when the guide fitting 4 is rotated by an angle of $\alpha/2$ about the axis of rotation 19 formed by the pin 14 with respect to the rest position. If the angle $\alpha$, or the value of $\alpha/2$ determined by means of the rotary potentiometer 13, is larger or, respectively, smaller than the predetermined value, then the angle of articulation $\alpha$ is corrected by a descent or respectively ascent of the slide 3 and thus of the guide fitting 4. In order to deactivate the electric motor 7, for example, in case of an error in the circuitry, end position switches are arranged at both ends of the path of movement of the slide 3, transmitting cutoff signals to the comparison circuit 10. FIG. 1 shows the lower end position switch 20.

It is possible by means of this invention to adjust the angle of articulation at all times to the same, predetermined optimum value, independently of the size of the vehicle occupants. The invention can be utilized in active as well as passive safety belt systems.

While we have shown and described only one embodiment in accordance with the present invention, it is understood that the same is not limited thereto but is susceptible to numerous changes and modifications as known to one having ordinary skill in the art, and we, therefore, do not wish to be limited to the details shown and described herein, but intend to cover all such modifications as are encompassed by the scope of the appended claims.

We claim:

1. An adjusting device for the point of articulation or the point of deflection of a safety belt in automotive vehicles, said adjusting device comprising:

slide means, constituting the point of articulation or deflection;

guide means carrying said slide means where said slide means are vertically adjustable in said guide means so that the angle of articulation of the safety belt resting on the shoulder of the vehicle occupant has a first predetermined value; and circuit means comprising:

electric pickup means for sensing the angle of articulation of the safety belt, a comparison circuit means responsive to said pickup, said comparison circuit means containing a reference of said first predetermined value and operable to adjust the slide means when the actual angle of articulation does not equal said first predetermined value.

2. The adjusting device according to claim 1, further comprising a drive mechanism for the slide means, wherein said comparison circuit means controls an electric motor means serving a electric drive means for said drive mechanism.

3. The adjusting device according to claim 2, further comprising
 a spindle driven by said electric motor means for the vertical adjustment of the slide means.

4. The adjusting device according to claim 1, further comprising
 means for activating the comparison circuit means only when the safety belt has been locked.

5. The adjusting device according to claim 4, wherein said means for activating comprises
 a switch means connected in the comparison circuit means, said switch means being closed when the safety belt is locked.

6. The adjusting device according to claim 2, wherein end position switches are contained in the path of movement of said slide means, said switches deactivating the electric motor means.

7. The adjusting device according to claim 1, wherein the first predetermined value of the angle of articulation is preset to a specific value dependent upon the specific vehicle the adjusting device is used on.

8. The adjusting device according to claim 1, wherein the pickup means for the angle of articulation comprises a rotary potentiometer.

9. The adjusting device according to claim 8, wherein the rotary potentiometer is integrated within a turning knuckle adjusting the angle of articulation.

10. The adjusting device according to claim 1, further comprising means to adjust said first predetermined value.

11. The adjusting device according to claim 10, further comprising:
 a drive mechanism for the slide means, wherein said comparison circuit means controls an electric motor means serving an electric drive means for said drive mechanism.

12. The adjusting device according to claim 11, wherein end position switches are contained in the path of movement of said slide means, said switches deactivating the electric motor means.

13. The adjusting device according to claim 11, further comprising:
 a spindle driven by said electric motor means for the vertical adjustment of the slide means.

14. The adjusting device according to claim 10, further comprising:
 means for activating the comparison circuit means only when the safety belt has been locked.

15. The adjusting device according to claim 14, wherein said means for activating comprises:
 a switch means connected in the comparison circuit means, said switch means being closed when the safety belt is locked.

16. The adjusting device according to claim 10, wherein the first predetermined value of the angle of articulation is preset to a specific value dependent upon the specific vehicle the adjusting device is used on.

17. The adjusting device according to claim 10, wherein the pickup means for the angle of articulation comprises a rotary potentiometer.

18. The adjusting device according to claim 17, wherein the rotary potentiometer is integrated within a turning knuckle adjusting the angle of articulation.

* * * * *